United States Patent [19]
Akimoto et al.

[11] Patent Number: 5,667,624
[45] Date of Patent: Sep. 16, 1997

[54] POLARIZATION PLATE GLUING APPARATUS

[75] Inventors: Takashi Akimoto; Kiyomi Tagaya; Susumu Ojima; Seiki Takeda, all of Noshiro, Japan

[73] Assignee: Ookubo Co., Ltd., Yamanashi-ken, Japan

[21] Appl. No.: 509,514

[22] Filed: Jul. 31, 1995

[30] Foreign Application Priority Data

Sep. 19, 1994 [JP] Japan .................................. 6-248359

[51] Int. Cl.$^6$ .................................................. B32B 35/00
[52] U.S. Cl. ........................ 156/389; 156/497; 156/517; 156/535; 156/541; 156/556; 156/569; 156/578
[58] Field of Search ........................ 156/354, 355, 156/389, 497, 517, 535, 541, 556, 569, 578

[56] References Cited

U.S. PATENT DOCUMENTS

| | | | |
|---|---|---|---|
| 3,047,934 | 8/1962 | Magner | 29/149.5 |
| 4,668,314 | 5/1987 | Endoh | 156/64 |
| 4,925,708 | 5/1990 | Waters | 428/1 |
| 5,030,322 | 7/1991 | Shimada | 156/655 |
| 5,110,623 | 5/1992 | Yuasa | 427/162 |
| 5,145,546 | 9/1992 | Yuasa | 156/324 |
| 5,269,868 | 12/1993 | Gofuku | 156/344 |
| 5,279,689 | 1/1994 | Shvartsman | 156/220 |
| 5,536,359 | 7/1996 | Kawada | 156/626.1 |
| 5,544,582 | 8/1996 | Bocko | 101/211 |

FOREIGN PATENT DOCUMENTS 6-308444  11/1994  Japan .

*Primary Examiner*—Jenna Davis
*Attorney, Agent, or Firm*—Richard C. Woodbridge

[57] ABSTRACT

The present invention relates to a polarization plate to a surface of a liquid crystal cell in a manufacturing process of a liquid crystal panel, where a rotary table is disposed with loading domains for the liquid crystal cell, with each domain sequentially moving to carry-in, cleaning, gluing and carry-out stations.

The cleaning mechanism serves to cause an elastic plate to be pushed to the surface of the liquid crystal cell, thereby removing foreign objects.

The gluing mechanism serves to cut the polarization plate on the carrier tape to a predetermined length, to thereby allow the same to be a polarization plate chip, which is in turn absorbed and supported by the glue head. The polarization chip is now torn apart from the carrier tape to thereby be glued to the surface of the liquid crystal cell.

By this, process of picking up the polariation plate can be shortened and the position of the polarization plate can be determined in a state of the polarization plate being absorbed and supported by the glue head.

6 Claims, 11 Drawing Sheets

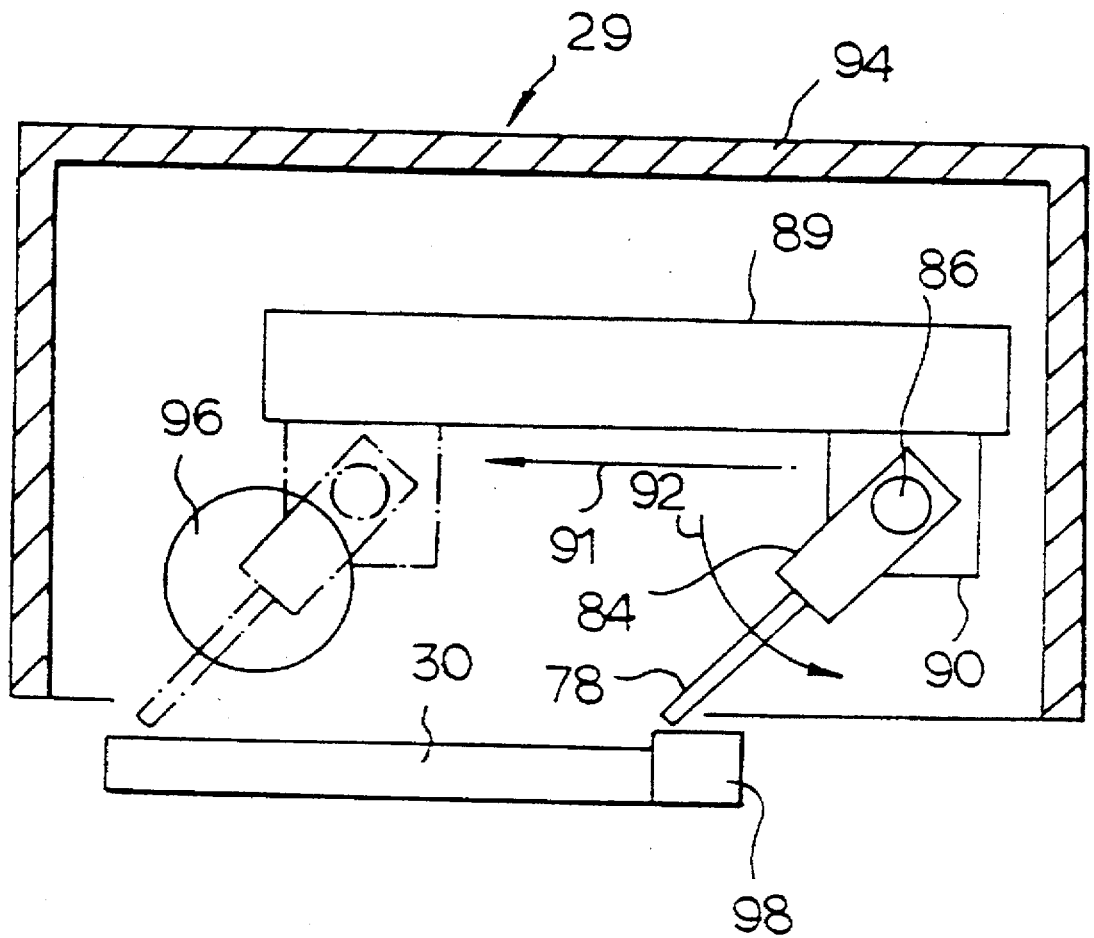

POLARIZATION PLATE GLUING APPARATUS

BACKGROUND OF THE INVENTION

1. Field of the Invention

The present invention relates to an apparatus for gluing a polarization plate to a surface of a liquid crystal cell in a manufacturing process of a liquid crystal panel.

2. Description of the Prior Art

There is a process in the manufacturing of a liquid crystal panel where a polarization plate is glued to a liquid crystal cell (liquid crystal display element).

Some of the principal functions required for the gluing apparatus in the manufacturing process of the liquid crystal panel include the functions of:

gluing the polarization plate to the liquid crystal cell with accuracy;

cleaning the surface of the liquid crystal cell before the polarization plate is glued thereto;

automatizing the gluing process for higher productivity at a good yield rate.

A gluing apparatus for polarization plate as a prior art is disclosed, where a tape-shaped polarization plate material is cut according as a predetermined length and this polarization plate chip is automatically glued to the surface of the liquid crystall cell.

However, there is a problem in the conventional gluing apparatus in that, although a gluing time is short per polarization plate chip, a glued position is not accurate, and, although the accuracy of the glued position is acceptable, the gluing time per chip is lengthened to thereby decrease the productivity, and no function is provided for removing foreign objects from the surface of the liquid crystal cell before the gluing process, thereby reducing the yield rate.

The thing is that there has been disclosed no gluing apparatus satisfying the required needs thus described.

FIG. 8 relates to a conventional gluing apparatus for a polarization plate, and more particalarly to side views for illustrating process where a cut polarization plate chip is taken from a carrier tape to be transported to a liquid crystal cell.

In FIG. 8A, a polarization plate material 12 is a strip-shaped material glued to a carrier tape 10, where only an upper side polarization plate material 12 is cut by a half-cutting instrument to thereby be divided into respective polarization chips 14 and sequentially transported from left to right direction.

When a forefront polarization plate chip 13 comes to a predetermined position, a glue head 16 is moved from a reference position 18 to left direction to thereby come to an upper portion of the polarization plate chip In FIGS. 8B through 8E, the reference position 18 of the glued head 16 is illustrated in an alternate long and short dash line.

Next, as illustrated in FIG. 8C, the glue head 16 is lowered to vacuum-suck the polarization plate chip 14, and as illustrated in FIG. 8D, a strip-shaped material of as much as one polarization plate chip is transported to the right direction under the same vacuum-sucked state, and the glue head 16 is synchronized there with to thereby be transported to the right direction in the same distance as the strip-shaped material.

Next, as illustrated in FIG. 8E, only the glue head 16 is moved to the right direction again even after stoppage of the strip-shaped material in order to prevent interference between mechanisms and to take off bond of adhesives between the polarization plate material and the carrier tape.

Now, bond by the adhesives between the polarization plate chip 14 and the carrier tape 10 is taken off to thereby allow the polarization plate chip 14 to be separated from the carrier tape 10.

Then, as illustrated in FIG. 8F, the glue head 16 is raised up to return to the reference position.

Next, the glue head 16 proceeds in a vertical direction from surface and moves to direction of the liquid crystal cell, and then the polarization plate chip 14 is glued to the liquid crystal cell by a release operation thereof to thereby cause the glue head 16 to return to the reference position. By this, the glue head 16 returns to a state of FIG. 8A.

The polarization plate chip is sequentially glued to the liquid crystal cell by repeated operations thus described.

Furthermore, there have been disclosed a few known means to remove foreign objects from the surface of the liquid crystal cell.

By way of example, the surface of the liquid crystal cell is cleaned with a glued roller, or air is pumped thereon or a rotary brush is used.

FIG. 9 is a perspective view for illustrating a conventional example where a cleaning plate is used.

Accordingly to FIG. 9, a liquid crystal cell 20 is put on an up-down stage and an edge 23 of a plate 22 is placed parallel lengthwise to the rectangular liquid crystal cell 20, and the plate 22 is moved verically to lengthwise direction of the liquid crystal cell 20. By this, the edge 23 of the plate 22 removes the foreign objects on the surface of the liquid crystal cell 20.

However, there is a problem in the conventional process illustrated in FIG. 8 in that moving processes of the glue head are numbered too many, and time (cycle time) required for gluing one polarization plate chip to the liquid crystal cell is lengthened.

In other words, there are six processes needed for the glue head in FIG. 8, i.e., move to left, lower suction, right synchronized move, right single move, rise and gluing operations.

Furthermore, in a conventional cleaning apparatus illustrated in FIG. 9, the liquid crystal cell 20 on the stage is raised up to a predetermined position and stopped thereat, and by this, contact between the surface of the liquid crystal cell 20 and the plate 22 is realized.

Accordingly, when thickness of the liquid crystal cell 20 is changed, contact pressure thereof is changed to a great extent.

Furthermore, the length where the edge 23 of the plate 22 contacts the liquid crystal cell at one time is relatively long because a lengthwise dimension of the rectangular liquid crystal cell 20 is the same as the contacted length.

Accordingly, there is another problem in that the cleaning cannot be performed uniformly because it can be affected by rectilinear accuracy of the edge 23 at the plate 22 or by ruggedness of the surface 21 of the liquid crystal cell 20.

SUMMARY OF THE INVENTION

The present invention has been disclosed to solve to aforementioned problem and it is an object of the present invention to provide a polarization plate gluing apparatus having a satisfactory accuracy at a glued position with a good productivity.

It is another object of the present invention to provide a polarization plate gluing apparatus having a satisfactory cleaning performance.

In accordance with the objects of the present invention, there is provided a polarization plate gluing apparatus employing a cleaning mechanism for cleaning surface of a liquid crystal cell, and a gluing mechanism for gluing the polarization plate to the surface of the liquid crystal cell, where the gluing mechanism comprises:

a feeding mechanism for feeding as long as a predetermined length a strip-shaped material overlapped by a polarization plate and a carrier tape;

a half-cutting mechanism for cutting only the polarization plate of the strip-shaped material;

a glue head for absorbing the polarization plate cut by the half-cutting mechanism to feed the same to the surface of the liquid crystal cell;

a retracting mechanism for retracting the strip-shaped material in a state where the polarization plate is absorbed and supported by the glue head; and a winding mechanism for winding only the carrier tape after the polarization plate is removed, and, where the cleaning mechanism comprises:

a plate for being pushed to the surface of the liquid crystal cell to relatively move against the surface of the liquid crystal cell;

a hood for covering space around the plate;

an absorption apparatus for absorbing air within the hood.

BRIEF DESCRIPTION OF THE DRAWINGS

For fuller understanding of the nature and objects of the invention, reference should be made to the following detailed description taken in conjunction with the accompanying drawings in which:

FIG. 7 is a side sectional view for illustrating an overall construction of the cleaning mechanism according to the embodiment of the present invention;

DETAILED DESCRIPTION OF THE INVENTION

Figure 1:
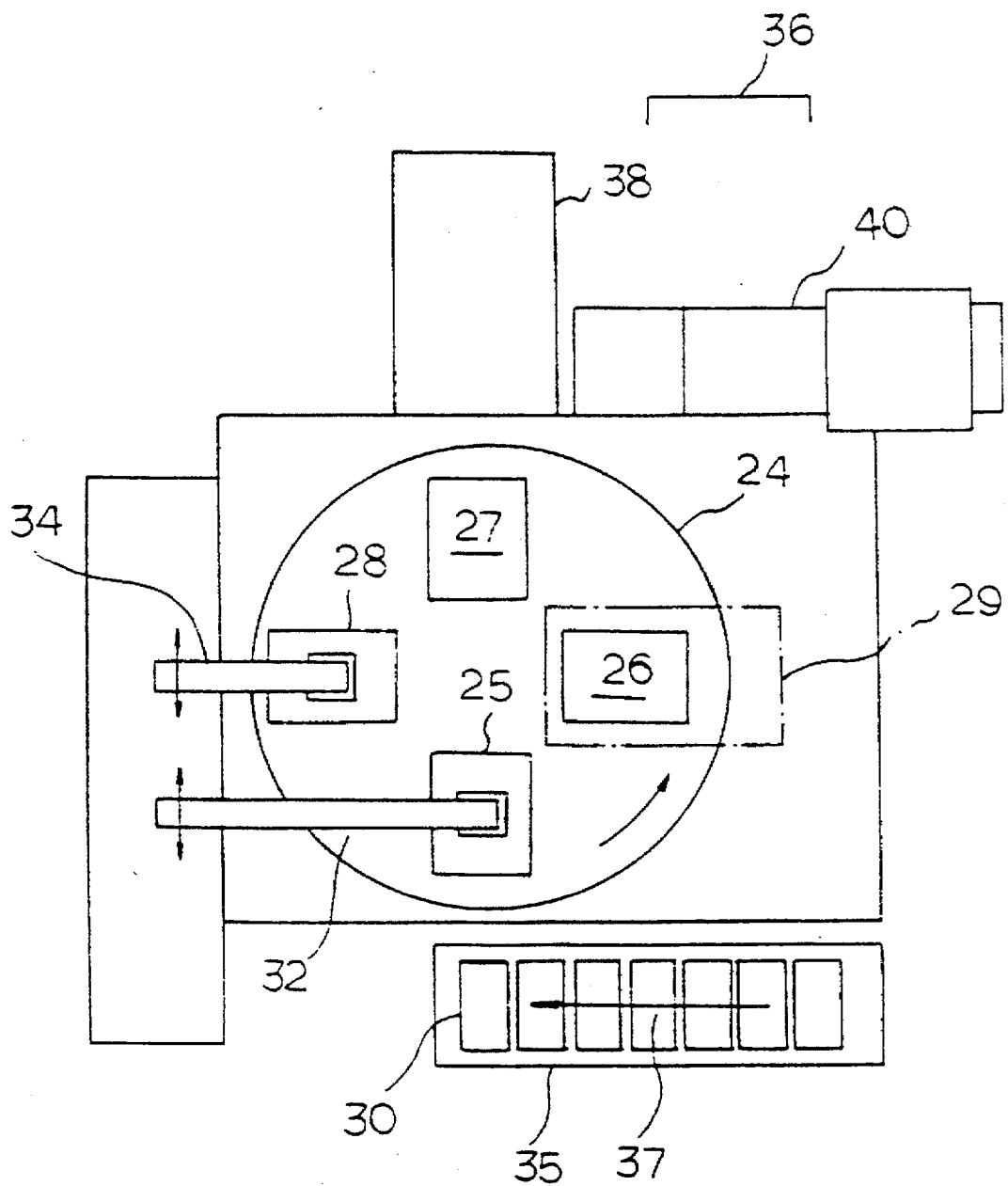
FIG. 1 is a schematical plan view for illustrating an embodiment according to the present invention.

FIG. 1 is a schematical plan view according to the embodiment of the present invention.

The polarization plate gluing apparatus is disposed with a revolving table 24 on which there are four loading domains 25, 26, 27 and 28 for putting the liquid crystal cell thereon. The four loading domains can sequentially pass through four stations according as the table revolves.

According to FIG. 1, the loading domain 25 is located at a carry-in station, the loading domain 26 is situated at a cleaning station, the loading domain 27 is disposed at a gluing station and the loading domain 28 is arranged at a carry-out station.

The gluing apparatus is disposed at a front side thereof with a conveyor 35 for returning the liquid crystal cell 30, which is sent back to an arrow head direction 37.

The liquid crystal cell 30 which has arrived at a left end of the conveyor 35 is vacuum-sucked by a pick-and-press mechanism 32 as a carry-in mechanism and is fed to the loading domain 25 located at the carry-in station. The liquid crystal cell 30 is vaccum-sucked to the table 24 at the carry-in station. The liquid crystal cell 30 supported by the loading domain 26 situated at the cleaning station has its surface cleaned by a cleaning mechanism 29 (described later).

The liquid crystal cell supported by the loading domain 27 located at the gluing station has its surface glued by the polarization plate according to a gluing mechanism 36 (described later). The liquid crystal cell supported by the loading domain 28 provided at the carry-out station is discharged to a discharge tray (not shown) by a pick-and-press mechanism 34 as a carry-out mechanism.

The gluing mechanism 36 is provided at a rear side of the gluing apparatus for the polarization plate and is constituted by a glue head driving mechanism 38 and a polarization plate supply mechanism 40.

Figure 2:
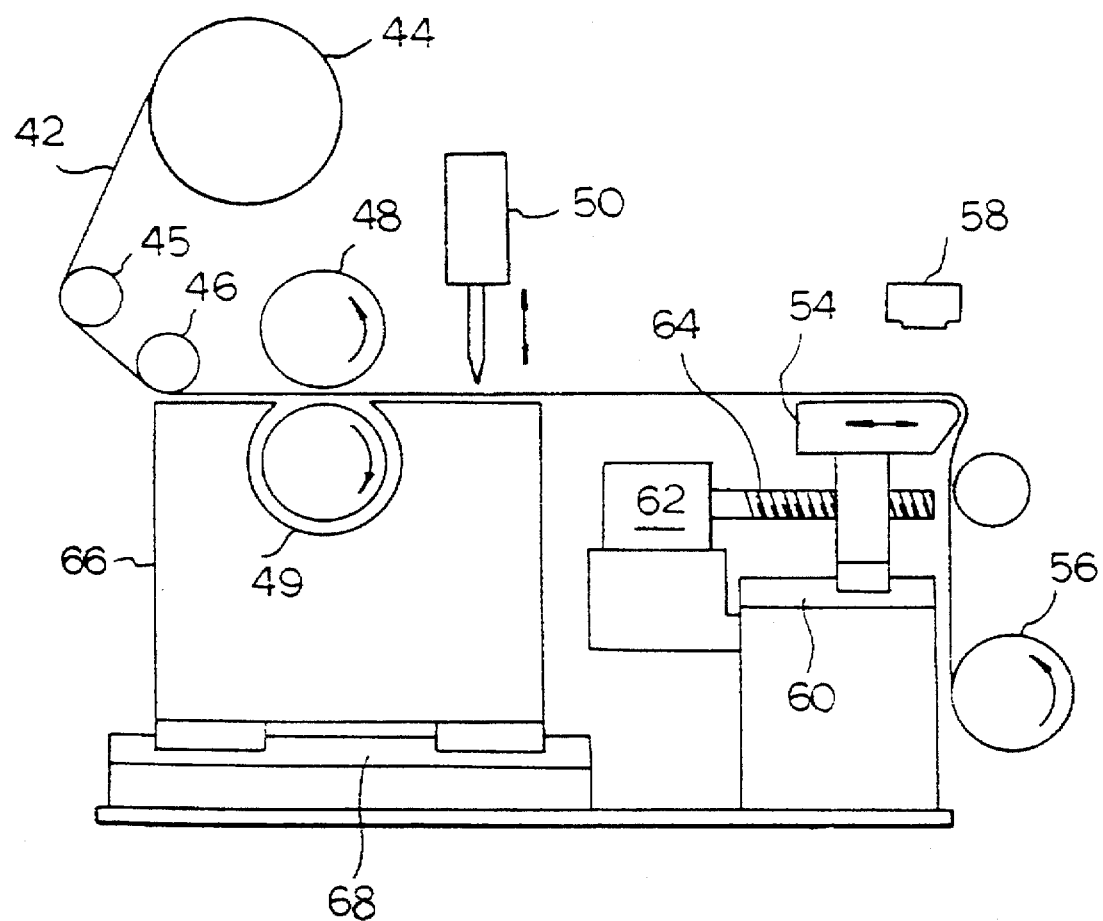
FIG. 2 is a side view of a supply mechanism for the polarization plate according to the embodiment of the present invention.

FIG. 2 is a side view of the polarization plate supply mechanism 40, seen from behind the polarization plate gluing apparatus. A continuous roll 44 is wound by a strip-shaped material 42.

The strip-shaped material 42 is made of the polarization plate and the carrier tape put together and coated by adhesives. The strip-shaped material 42 continuously produced from the continuous roll 44 passes through guide rollers 45 and 46 and is fed by a pair of feeding rollers 48 and 49 as much as a predetermined distance.

The predetermined distance is the same as the dimension of one polarization plate chip in an aggregate between cycles of the gluing process.

In the present embodiment, there is a 25 mm feeding process and a 5 mm regressing process for the strip-shaped material 42, as described later. As a result, the strip-shaped material is fed as long as 20 mm in one cycle.

When the feeding process is completed by the feeding rollers 48 and 49, only polarization plate material 51 is cut in the strip-shaped material 42 by the half-cut mechanism 50 to thereby become a polarization plate chip 52.

The polarization plate chip 52 is still in a state of being absorbed to the carrier tape 53 even after it is cut.

Now, back to FIG. 2, the feeding mechanism or the half-cut mechanism 50 from the continuous roll 44 to the feeding rollers 48 and 49 is supported by a support pad 66.

The support pad 66 can travel back and forth in a feeding direction of the strip-shaped material according to a rectilinear motion guide mechanism 68.

Reference position of the support pad 65 can be determined automatically or manually.

Figure 3:
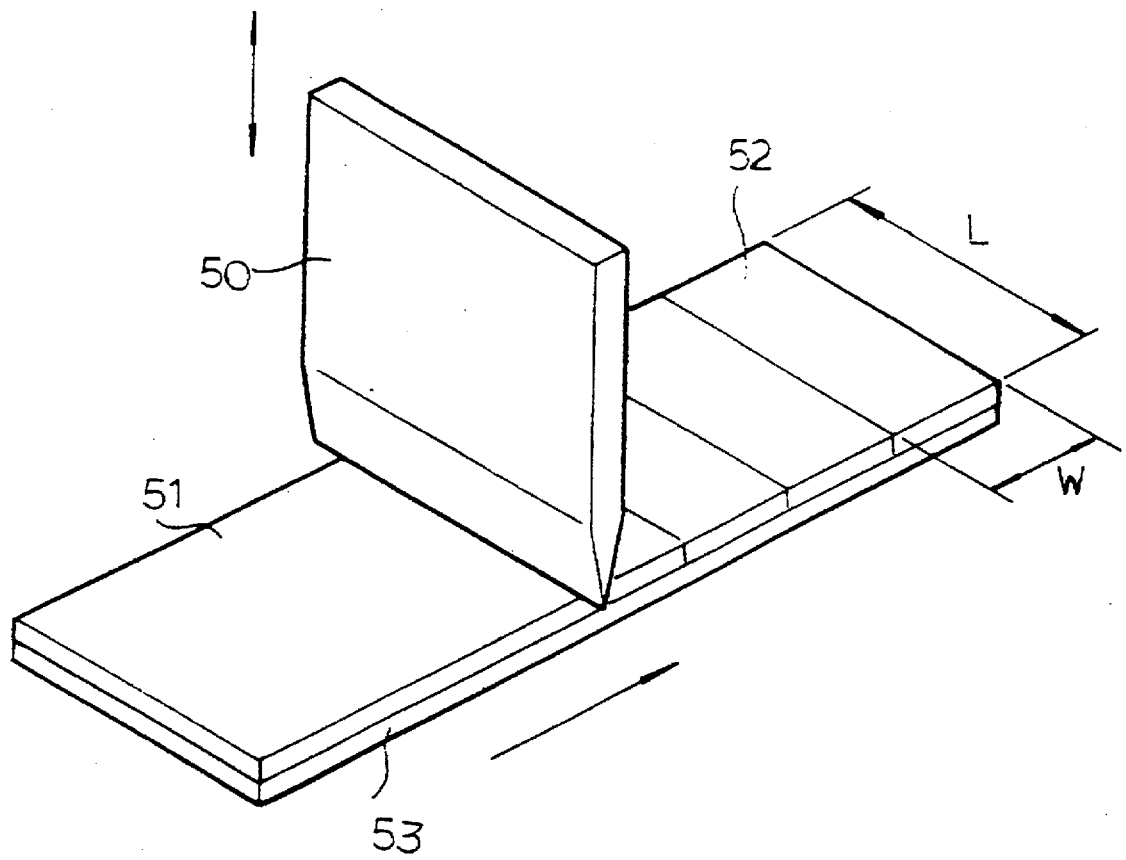
FIG. 3 is a pespective view for illustrating when a strip-shaped material is cut by the half-cut according to the embodiment of the present invention.

The polarization plate is cut in a rectangular shape as illustrated in FIG. 3, and lengthwise direction of the cut polarization plate chip 52 is located perpendicular to the feeding direction of the strip-shaped material. Accordingly, a feeding distance for one cycle portion according to the feeding rollers is the same as the width (W) of the polarization plate chip 52. The dimension of the polarization plate chip 52 in the present embodiment is measured 60 mm lengthwise and 20 mm widthwise.

Again back to FIG. 2, the strip-shaped material 42, after passing over a transfer base 54, is wound by a winding roller 56. The polarization plate on the carrier tape in the strip-shape material 42 is cut by the half-cut mechanism 50 and is sequentially absorbed to glue head 58, so that only the carrier tape is wound by the winding roller 55.

The carrier tape is provided a certain tension by the winding roller 56.

The transfer base 54 is guided to the rectilinear motion guide mechanism 60 to thereby be reciprocatingly transferred in an outgoing direction of the strip-shaped material and is driven by a ball thread 64 rotated by a motor 62.

In the present embodiment, the transfer base moves back and forth as far as a width (W) of the polarization plate chip.

FIG. 4 is a side view for illustrating a process where a cut polarization plate chip is taken from a carrier tape to thereby be fed to a liquid crystal cell.

It should be noted that thickness of the polarization plate chip 52 and that of the carrier tape are exaggerated for illustration purpose.

Figure 4A:
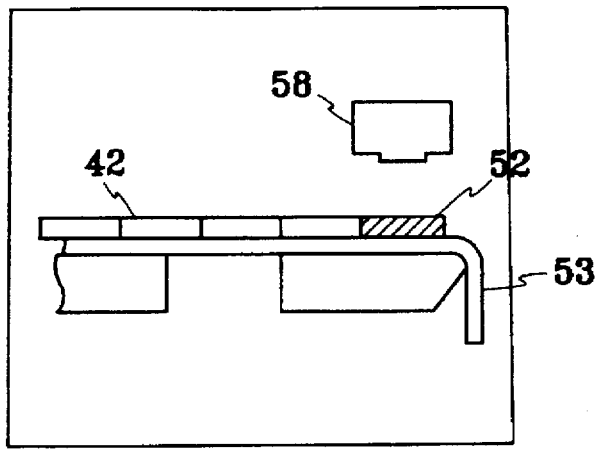
FIG. 4 is a side view for illustrating a process where the polarization plate cut according to the embodiment of the present invention is removed from a carrier tape to thereby be fed to the liquid crystal cell.

In FIG. 4A, only an upper side of polarization plate material is cut by the half-cut mechanism in the strip-shape material 42 and is fed as far as a predetermined distance from left to right directions in a state of respectively divided polarization plate chips 52.

Figure 4B:
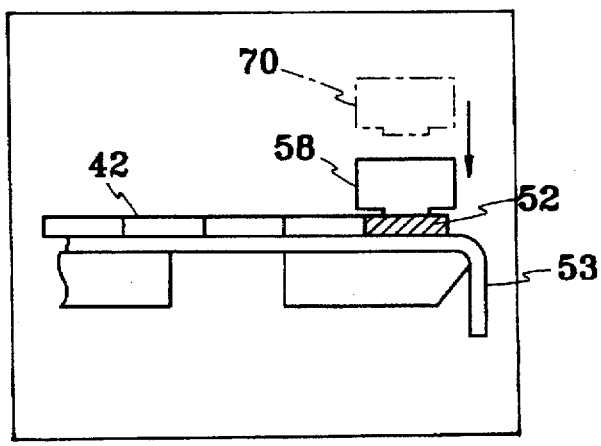

When a forefront polarization plate chip 52 comes to a predetermined position, the glue head 58 just above a reference position 70 comes down as illustrated in FIG. 4B and vacuum-sucks the polarization plate chip 52.

Figure 4C:
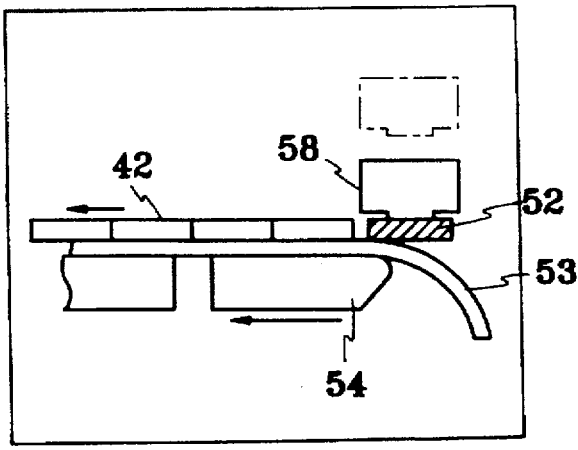

Furthermore, in FIGS. 4B and 4C, the reference position of the glue head is illustrated in an alternate long and short dash line.

Next, as illustrated in FIG. 4C, the transfer base 54 is retreated to a distance as much as the width (W) of the polarization plate chip in other words, 20 mm.

Right after that, the feeding roller is reversely rotated to thereby cause the strip-shaped material 42 to retreat by 5 mm also.

Accordingly, a carrier tape 53 underneath the polarization plate chip 52 absorbed to the glue head 58 is also retracted to as far as 5 mm.

Figure 4D:
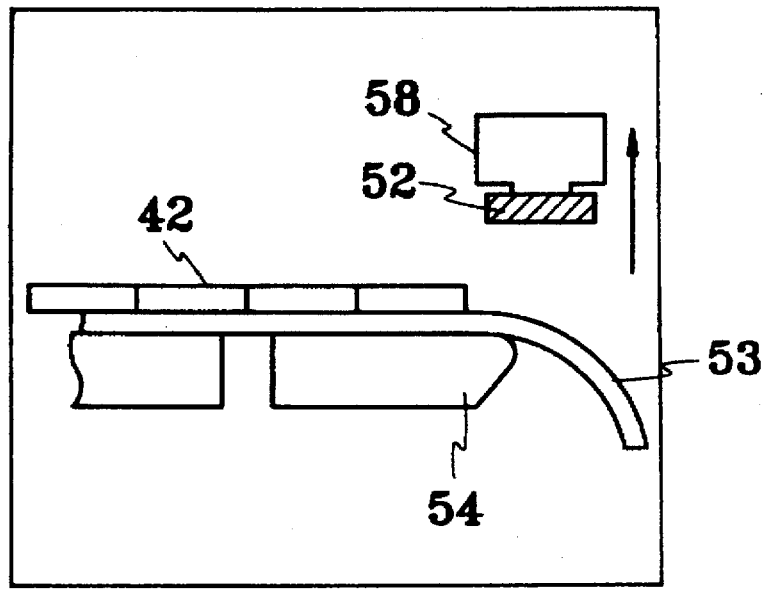

While the strip-shaped material 42 is regressed, and because the glue head 58 is stopped thereat, the adhesives between the carrier tape 53 and the polarization plate chip 52 absorbed to the glue head 58 by the retreating motion of the carrier tape 53 are peeled off, as described in the aforesaid, so that the polarization plate chip 52 is torn apart from the carrier tape 53. Then as illustrated in FIG. 4D, the glue head 58 is raised up to thereby return to the reference position.

Thereafter, the glue head 58 moves toward a vertical direction to ground (It should be noted that a position determining operation of the polarization plate chip is being performed in the midst of the forward movement as described later), and the polarization plate chip 52 is glued to the liquid crystal cell by a return operation thereof, and returns to the reference position.

Figure 4E:
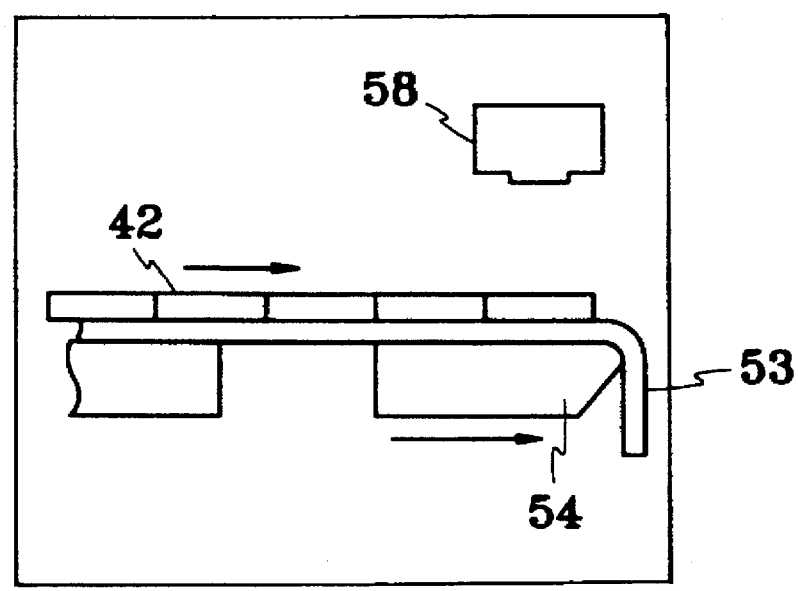

The strip-shaped material 42 is fed as far as 25 mm to the right direction by the feeding roller in the midst of the gluing operation, as illustrated in FIG. 4E. The transfer base 54 is also moved forward as far as 25 mm in synchronization with the feeding.

When the feeding is completed, the half-cut mechanism starts to operate and the gluing operation returns to a state illustrated in FIG. 4A.

By repeating the operations thus described, the polarization plate chip is sequentially glued to the liquid crystal cell. As apparent from the foregoing, the feeding roller concurrently performs a role as a feeding mechanism of strip-shaped material and as a regressing mechanism.

The number of processes which cannot be performed at the same time in FIG. 4 is the lower suction of the glue head, regress of the strip-shaped material, rise of the glue head and gluing operation. In other words, four processes cannot be operated at the same time. The reason is that acceptance of the regress motion of the strip-shaped material enables the glue head to dispense with the need to move forward or backward in the feeding direction of the strip-shaped material.

Figure 5A:
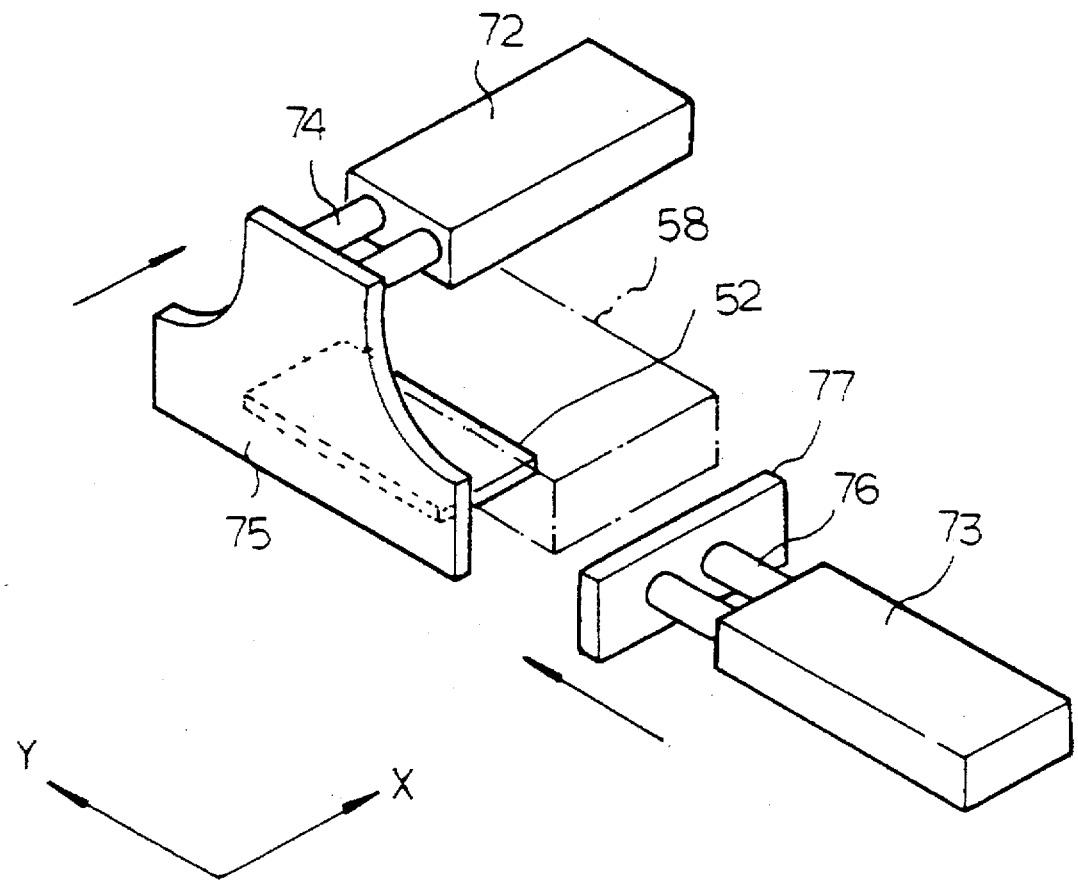
FIG. 5A is a perspective view of a position determining mechanism for determining a position for a polarization plate chip absorbed to a glue head according to the embodiment of the present invention and FIG. 5B is a side view for illustrating a glue operation.

FIG. 5A is a perspective view of a position determining mechanism for determining a position for the polarization plate chip 52 sucked to the glue head 58.

A support body (not shown) for supporting the glue head 58 is fixedly disposed with an X moving cylinder 72 and an Y moving cylinder 73.

The X moving cylinder 72 is fixedly provided at a tip end of a piston 74 thereof with an X direction position determining plate 75, and the Y moving cylinder 73 is fixedly arranged at a tip end of a piston 76 thereof with an Y direction position determining plate 77.

The piston 74 is shrunken to a predetermined position while the glue head 58 moves ahead from the reference position 70 illustrated in FIG. 4 toward the liquid crystal cell, and at the same time, the piston 76 is elongated to a predetermined position.

Then, the polarization plate chip 52 absorbed to the glue head 58 is pressed by the X direction position determining plate 75 and the Y direction position determining plate 77 and moves toward the X direction and the Y direction in a state of being absorbed to the glue head 58.

In other words, the polarization plate chip 52 slidingly moves toward an absorption capsule.

By this, position of the polarization plate chip 52 is accurately determined against the glue head 58.

When the position determining operation is completed, the piston 74 is elongated to an original position while the piston 76 is shrunken to the original position, and the two position determining plates 75 and 76 remain in stand-by state until a next polarization plate chip is absorbed.

Now, suction pressure will be described in the course of the absorption.

When the glue head 58 is picking up the polarization plate chip 52, negative pressure for absorption is in a non-leak state (atmospheric pressure of minus 500 mm Hg). When position determination of X and Y directions are made, the negative pressure is caused to be leaded out to thereby allow the same to be under atmospheric pressure of minus 100 mm Hg.

By this, in the courses of determining positions for X and Y directions, the polarization plate chip 52 can be easily slid and moved under the same absorption state.

Figure 5B:
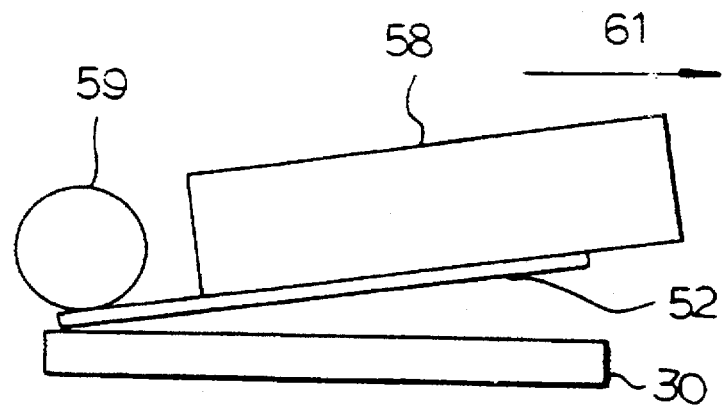

FIG. 5B is a side view for illustating an operation where the polarization plate chip 52 absorbed to the glue head 58 is glued to the liquid crystal cell 30.

The polarization plate chip 52 is absorbed at one lengthwise end thereof protruding from the glue head 58, and a glue roller 59 is caused to contact the protruded portion thereof.

The glue roller 59 is rotatatively arranged at the glue head 58. When the glue head 58 returns in the arrow head direction 61, the glue head 58 is slanted, and the glue roller 59 pushes one end of the polarization plate chip 52 toward surface of the liquid crystal cell 30. When the glue head 58 is moved toward the arrow head direction 61, a free-rolling rotary roller 59 is rotated to thereby push the polarization plate chip 52 to the surface of the liquid crystal cell 30, and the polarization plate chip 52 is disengaged from the glue head 58 to thereby be glued to the surface of the liquid crystal cell 30.

Figure 6A:
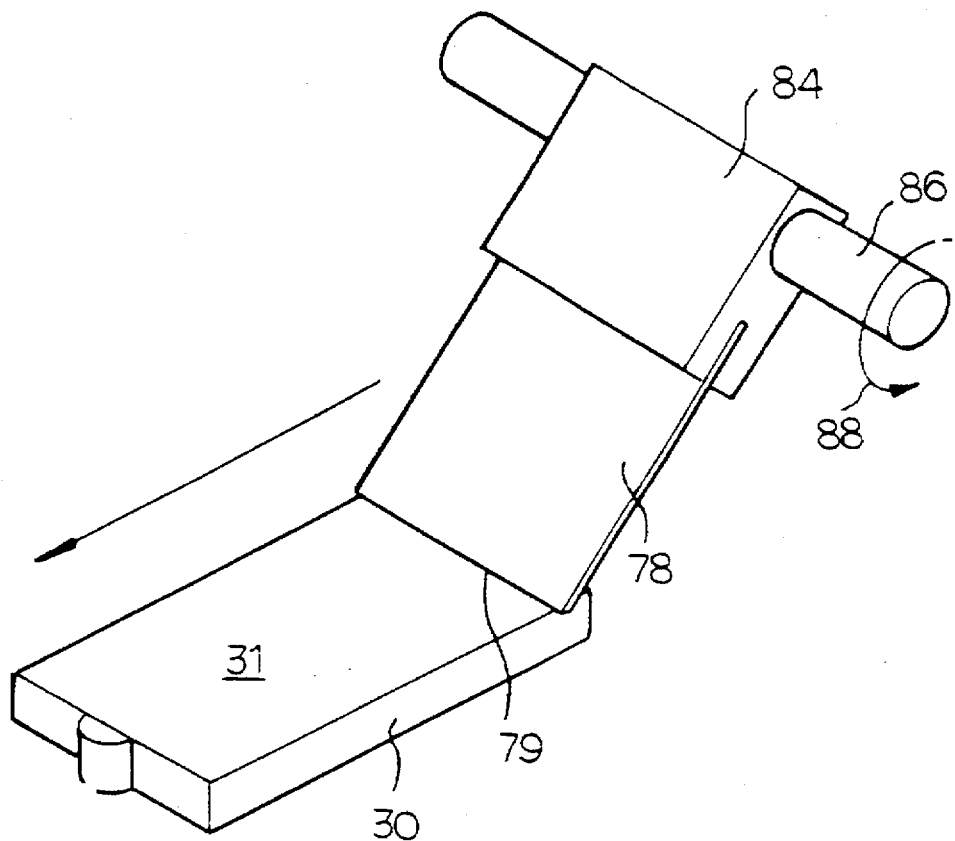
FIG. 6A is a perspective view of principal portions of a cleaning mechanism according to the embodiment of the present invention and FIG. 6B is a plan view for illustrating a position-determined state of the liquid crystal cell.

FIG. 6A is a perspective view of principal portions of a cleaning mechanism. A cut edge 79 of a plate 78 constituted by a thin stainless steel having a thickness of 0.5 mm is pushed to the surface 31 of the liquid crystal cell 30 and is thereafter moved to a lengthwise direction of the rectangular liquid crystal cell 30, thereby removing foreign objects on the surface 31 of the liquid crystal cell 30.

Base of the plate 78 is supported to a support body 84 which is in turn fixed by a rotary shaft 86.

The rotary shaft 86 is provided with a turning moment illustrated in an arrow head direction 88 by pneumatic actuator.

If pressing force by the plate 78 is calculated, the turning moment according to the pneumatic actuator in the present embodiment is approximately 7 kgf.cm, a distance to a cut edge 79 of the plate 78 from a center of the rotary shaft 86 is 56 mm. Because the plate 78 slantly contacts the surface 31 of the liquid crystal cell 30 at approximately 45 degrees, pushing force to a vertical direction of the surface 31 of the liquid crystal cell 30 by the cut edge 79 of the plate 78 is pushed to the surface 31 of the liquid crystal cell 30, the plate 78 is forced to be deformed slightly by elasticity thereof.

The elasticity contributes to uniformality of the cleaning. The length of the plate 78 contacting the liquid crystal cell 30 is the same as the widthwise (orthogonal direction lengthwise) length of the rectangular liquid crystal cell 30, which is 20 mm.

Figure 9:
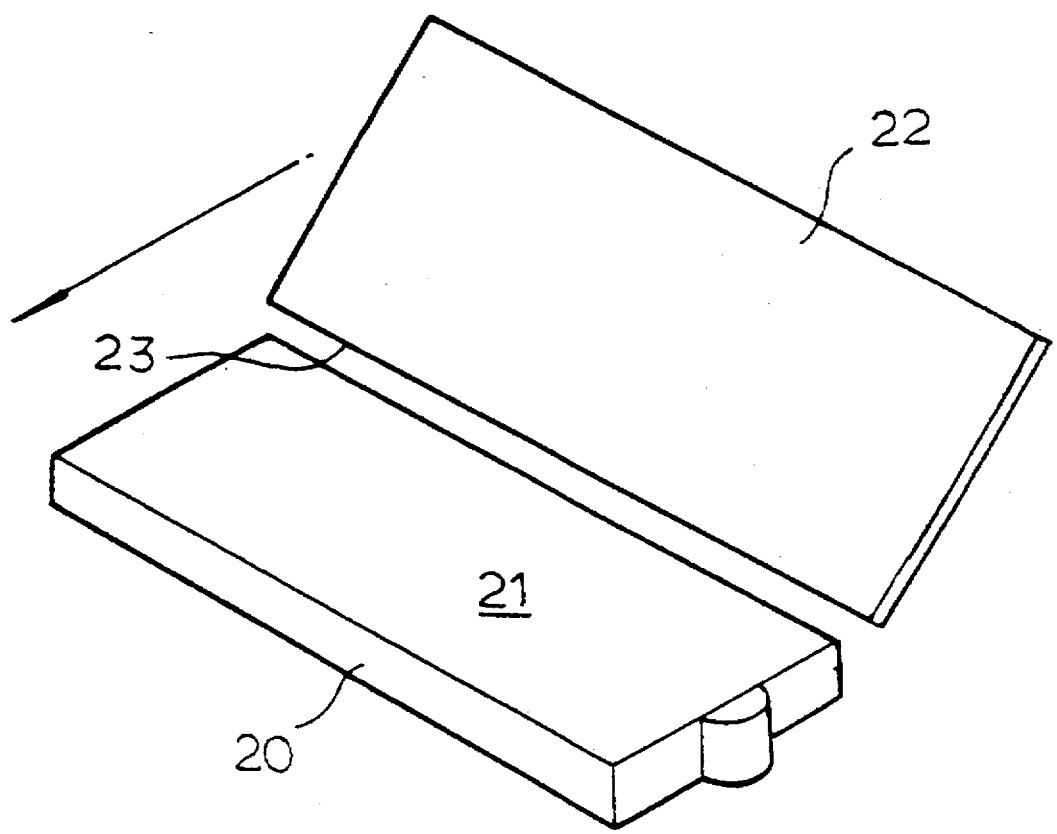
FIG. 9 is a perspective view for illustrating the conventional polarization plate gluing apparatus.

Accordingly, the cut edge of the plate stretching lengthwise (shown in FIG. 9), if compared with a conventional method, has a shorter contact distance, to thereby receive no influence resulting from deviations of the surface 31 of the liquid crystal cell 30 and the like, so that a uniform pressing force can be expected on an overall surface 31 of the liquid crystal cell 30.

Furthermore, because the length of the cut edge 79 is shortened, rectilinearity of the cut edge 79 can be improved when the plate 78 is manufactured. Still furthermore, the turning moment is given to the plate 78 by the pneumatic actuator, thereby unifying the pressing force, even though there exist deviations in the thickness of the liquid crystal cell 30.

By reasons of the above mentioned, the cleaning mechanism can clean the surface of the liquid crystal cell without any deviation, compared with that of the conventional method.

Figure 6B:
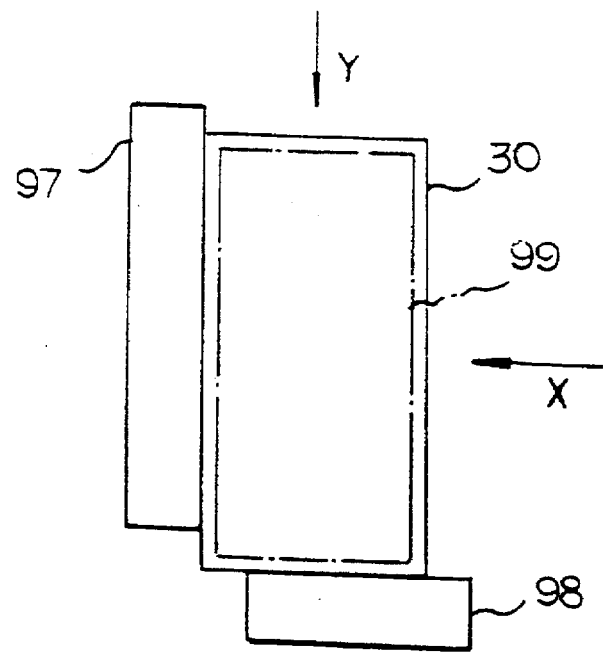
Figure 8A:
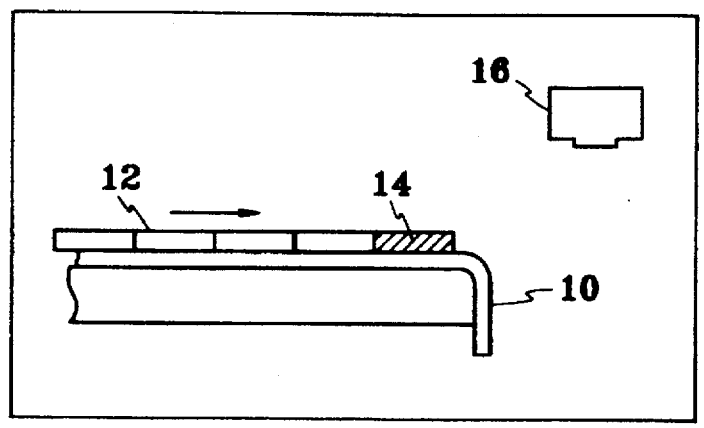
FIG. 8 is a side view for illustrating a pick-up process of a polarization plate chip in a conventional polarization plate gluing apparatus.
Figure 8B:
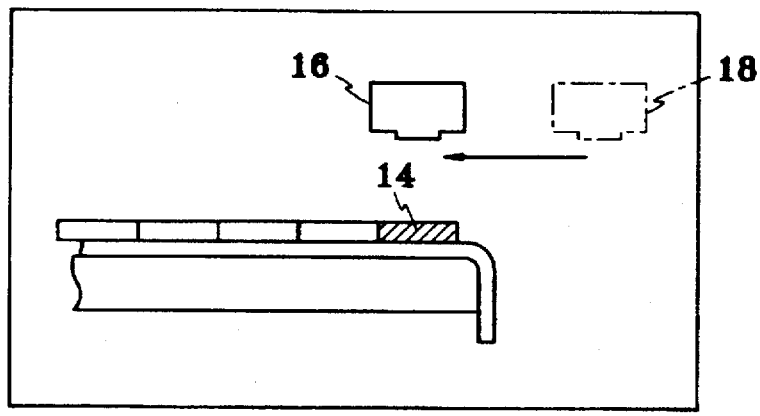
Figure 8C:
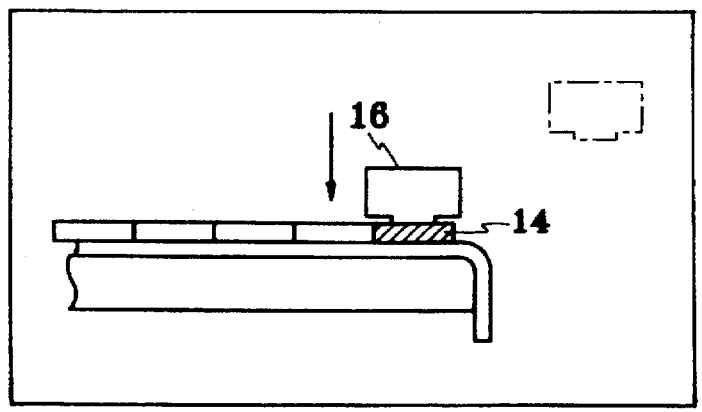
Figure 8D:
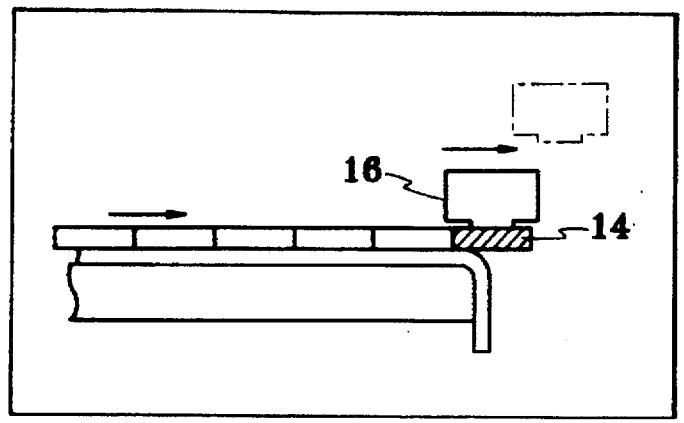
Figure 8E:
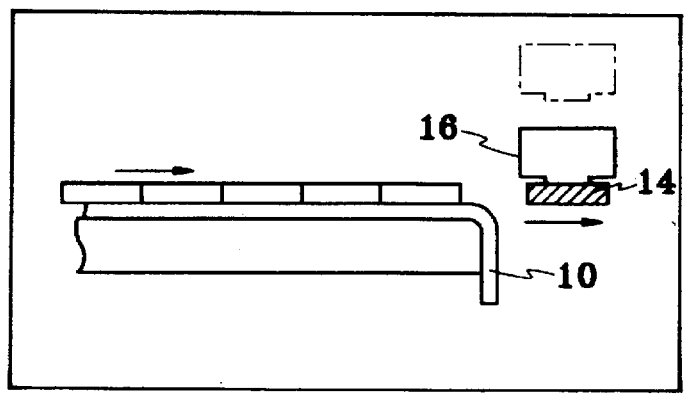
Figure 8F:
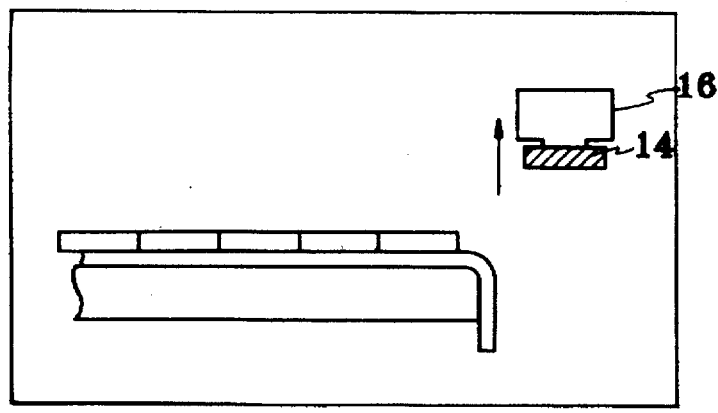

FIG. 6B is a plan view for illustrating a state of a position determination of the liquid crystal cell 30 which has reached a cleaning station.

Once the liquid crystal cell 30 absorbed to a loading domain of a table reaches the cleaning station, vacuum-absorption of the liquid crystal cell 30 is released, and the liquid crystal cell 30 is pushed from X and Y directions toward an X guide 97 and an Y guide 98, so that the position of the liquid crystal cell 30 can be determined. And then, the liquid crystal cell 30 is again vacuum-absorbed.

Now, the surface of the liquid crystal cell 30 is cleaned in the same way as described above.

When the cleaning is started, the cut edge 79 of the plate 78 is firstly pushed above the Y guide 98, and when the plate 78 is moved toward lengthwise direction of the liquid crystal cell, the cut edge 79 of the plate 78 is moved from the Y guide 98 toward the surface of the liquid crystal cell.

Height of the surface of the X guide 97 and the Y guide 98 is 0.15 mm higher than that of the surface of the liquid crystal cell 30, so that the cut edge 79 of the plate 78 is smoothly proceeded from surface of the Y guide 98 to the surface of the liquid crystal cell 30. Furthermore, domain 99 indicated in the alternated long and short dash line in FIG. 6B is an area where the polarization plate chip is glued. The area is approximately 0.5 mm–1.0 mm inside respective four sides of the surface of the liquid crystal cell 30.

FIG. 7 is side sectional view for illustrating an overall construction of the cleaning mechanism 29.

A horizontal guide 89 is reciprocatingly provided at a lower side thereof with a moving body 90, which is in turn rotatatively arranged with a rotary shaft 86. The shaft 86 is fixed by the aforesaid support body 84 and the plate 78. The guide 89, moving body 90, the plate 78 thereunder and the like are surrounded by a hood 94. The hood 94 is formed with a suction opening 96, which is in turn connected to a suction pump, so that air in the hood 94 can be sucked.

When the liquid crystal cell 30 arrives at the cleaning station, the plate 78 is rotated in the arrow head direction 92, to thereby be pushed to the surface of the Y guide 98.

Now, the moving body 90 moves along the guide 89 in the arrow head direction 91, so that the cut edge 79 of the plate 78 comes to clean the surface of the liquid crystal cell 30.

Foreign objects dispersed to the air by being sucked in the plate 78 are absorbed by the suction opening 96. Accordingly, the foreign objects scattered in the air cannot be attached to the liquid crystal cell.

The overall specifications of the gluing apparatus according to the embodiment of the present invention can be summarized as follows:

Dimensions of glueable polarization plate chip are minimum 15 mm×30 mm, and maximum 60 mm×120 mm.

Accuracy of glued position for the polarization plate is ±0.1 mm for both X and Y directions.

Required glueing time (cycle time) for each polarization plate chip is 3.5 seconds on the average.

General effects of the gluing apparatus according to the present invention can be summarized as below:

1. The apparatus is disposed with a mechanism for retreating a strip-shaped material when a glue head is in a state of absorbing and supporting a polarization plate, so that there is no need to move the glue head toward the feeding direction of the strip-shaped material in order to tear off the polarization plate from a carrier tape. Therefore, moving process of the glue head has become simplified, and glueing time per polarization plate chip has been shortened to thereby increase the productivity.

2. A position determining mechanism for determining a position of the polarization plate chip against the glue head is arranged in a state where the glue head absorbs and supports the polarization plate chip, so that the position determination of the polarization plate chip can be completed during a time the glue head transfer the polarization plate chip toward the liquid crystal cell. Accordingly, productivity will not be sacrificed to thereby increase accuracy of the glued position thereof.

3. As for a cleaning mechanism, a resilient plate is pressingly forced to surface of the liquid crystal cell, thereby obtaining a uniform pressed force thereon even though there exist deviations in the thickness of the liquid crystal cell.

Furthermore, because the plate is relatively moved toward a lengthwise direction of the liquid crystal cell, it is not affected by rectilinearity of a cut edge of the plate or unevenness of the surface of the liquid crystal cell to thereby obtain a good cleaning performance.

Still furthermore, the plate is wrapped at a periphery thereof by a hood, thereby allowing the air in the hood to be absorbed or discharged, so that foreign objects are prevented from being sticked to the liquid crystal cell again.

By this, cleaning performances can be improved to thereby increase a good yield rate of production and general productivity.

What is claimed is:

1. A polarization plate gluing apparatus empolying a cleaning mechanism for cleaning a surface of a liquid crystal cell, and a gluing mechanism for gluing a polarization plate to the surface of the liquid crystal cell, where the gluing mechanism comprises:
    a feeding mechanism for feeding a predetermined length of strip-shaped material substantially overlapped by a polarization plate and a carrier tape;
    a half-cutting mechanism for cutting only the polarization plate of the strip-shaped material;
    a glue head for absorbing the polarization plate cut by the half-cutting mechanism to feed the same to the surface of the liquid crystal cell;
    a retracting mechanism for retracting the strip-shaped material in a state where the polarization plate is absorbed and supported by the glue head; and
    a winding mechanism for winding only the carrier tape after the polarization plate is removed.

2. A polarization plate gluing apparatus as defined in claim 1, wherein the gluing mechanism comprises a moving base for guiding the carrier tape at an approximate position where the polarization plate is absorbed by the glue head, and the moving base moves back and forth toward a feeding direction of the strip-shaped material.

3. A polarization plate gluing apparatus as defined in claim 1, wherein the gluing mechanism comprises a positioning determined mechanism for determining a position of the polarization plate against the glue head in a condition in which the glue head has absorbed the polarization plate.

4. A polarization plate gluing apparatus employing a cleaning mechanism for cleaning a surface of a liquid crystal cell and a gluing mechanism for gluing a polarization plate to the surface of the liquid crystal cell, where the cleaning mechanism comprises:
    a plate for being pushed to the surface of the liquid crystal cell to move relative to the liquid crystal cell;
    a hood for covering space around the plate; and
    an absorption apparatus for absorbing air within the hood.

5. A polarization plate gluing apparatus employing a cleaning mechanism for cleaning the surface of a liquid crystal cell glued to a polarization plate and a gluing mechanism for gluing crystal cell, where the cleaning mechanism includes an elastic plate for being pushed to the surface of the liquid crystal cell to move relative to the liquid crystal cell, and the plate moves in a lengthwise direction of the liquid crystal cell.

6. A polarization plate gluing apparatus comprising:
    a table for moving a liquid crystal cell among a carry-in station, a cleaning station, gluing station and a carry-out station;
    a carry-in mechanism for carrying the liquid crystal cell to the carry-in station;
    a cleaning mechanism for cleaning the surface of the liquid crystal cell at the cleaning station;
    a gluing mechanism for gluing a polarization plate to the surface of the liquid crystal cell at the gluing station; and
    a carry-out mechanism for carrying out the liquid crystal cell from the carry-out station, where the cleaning mechanism further comprises:
        an elastic plate for being pushed to th surface of the liquid crystal cell to relatively move to a lengthwise direction of the liquid crystal cell against the surface of the liquid crystal cell;
        a hood for covering space around the plate; and
        an absorption apparatus for absorbing air within the hood, and where,
    the gluing mechanism further comprises:
        a feeding mechanism for feeding a predetermined length of strip-shaped material substantially overlapped by a polarization plate and a carrier tape;
        a half-cutting mechanism for cutting only the polarization plate of the strip-shaped material;
        a glue head for absorbing the polarization plate cut by the half-cutting mechanism to feed the same to the surface of the liquid crystal cell;
        a retracting mechanism for retracting the strip-shaped material in a state where the polarization plate is absorbed and supported by the glue head;
        a winding mechanism for winding only the carrier tape after the polarization plate is removed; and
        a position determination mechanism for determining a position of the polarization plate against the glue head when the glue head absorbs the polarization plate.

* * * * *